US010037428B2

(12) United States Patent
Roth et al.

(10) Patent No.: US 10,037,428 B2
(45) Date of Patent: *Jul. 31, 2018

(54) DATA SECURITY USING REQUEST-SUPPLIED KEYS

(71) Applicant: Amazon Technologies, Inc., Seattle, WA (US)

(72) Inventors: Gregory Branchek Roth, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,315

(22) Filed: Apr. 4, 2016

(65) Prior Publication Data

US 2016/0217290 A1  Jul. 28, 2016

Related U.S. Application Data

(63) Continuation of application No. 14/037,292, filed on Sep. 25, 2013, now Pat. No. 9,311,500.

(51) Int. Cl.
*H04L 9/08* (2006.01)
*G06F 21/60* (2013.01)
(Continued)

(52) U.S. Cl.
CPC ........ *G06F 21/602* (2013.01); *G06F 21/6209* (2013.01); *H04L 9/0822* (2013.01);
(Continued)

(58) Field of Classification Search
CPC ... H04L 9/0819; H04L 9/0822; H04L 9/0825; H04L 9/3242; H04L 9/3247;
(Continued)

(56) References Cited

U.S. PATENT DOCUMENTS 5,179,591 A  1/1993  Hardy et al.
5,200,999 A  4/1993  Matyas et al.
(Continued)

FOREIGN PATENT DOCUMENTS

CN  101938461  1/2011
CN  102624737  8/2012
(Continued)

OTHER PUBLICATIONS

Schneier, Applied Cryptography, 1996, John Wiley & Sons, 2$^{nd}$ Edition, pp. 34-41.*
(Continued)

*Primary Examiner* — Minh Dinh
(74) *Attorney, Agent, or Firm* — Davis Wright Tremaine LLP

(57) ABSTRACT

Requests are submitted to a request processing entity where the requests include a cryptographic key to be used in fulfilling the request. The request processing entity, upon receipt of the request, extracts the key from the request and uses the key to perform one or more cryptographic operations to fulfill the request. The one or more cryptographic operations may include encryption/decryption of data that to be/is stored, in encrypted form, by a subsystem of the request processing entity. Upon fulfillment of the request, the request processing entity may perform one or more operations to lose access to the key in the request, thereby losing the ability to use the key.

19 Claims, 15 Drawing Sheets

(51) Int. Cl.
    *G06F 21/62*     (2013.01)
    *H04L 29/06*     (2006.01)
    *H04L 9/32*     (2006.01)

(52) U.S. Cl.
    CPC ........ *H04L 9/3226* (2013.01); *H04L 63/0428* (2013.01); *H04L 63/06* (2013.01); *H04L 9/0819* (2013.01); *H04L 9/3242* (2013.01); *H04L 9/3247* (2013.01); *H04L 2209/76* (2013.01)

(58) Field of Classification Search
    CPC . H04L 2209/76; H04L 63/0428; H04L 63/06; G06F 21/6209
    See application file for complete search history.

(56) References Cited

U.S. PATENT DOCUMENTS

| | | | |
|---|---|---|---|
| 5,497,421 A | 3/1996 | Kaufman et al. | |
| 6,084,969 A * | 7/2000 | Wright | H04L 63/0464 340/7.21 |
| 6,097,817 A | 8/2000 | Bilgic et al. | |
| 6,185,316 B1 | 2/2001 | Buffam | |
| 6,453,416 B1 | 9/2002 | Epstein | |
| 6,760,711 B1 | 7/2004 | Gillett et al. | |
| 6,826,686 B1 | 11/2004 | Peyravian et al. | |
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 * | 3/2006 | Matyas, Jr. | H04L 9/3073 713/160 |
| 7,073,195 B2 | 7/2006 | Brickell et al. | |
| 7,139,917 B2 | 11/2006 | Jablon | |
| 7,228,417 B2 | 6/2007 | Roskind | |
| 7,320,076 B2 * | 1/2008 | Caronni | G06F 21/6218 713/193 |
| 7,512,965 B1 | 3/2009 | Amdur et al. | |
| 7,685,430 B1 | 3/2010 | Masurkar | |
| 7,721,322 B2 | 5/2010 | Sastry et al. | |
| 7,757,271 B2 | 7/2010 | Amdur et al. | |
| 7,765,584 B2 | 7/2010 | Roskind | |
| 7,836,306 B2 | 11/2010 | Pyle et al. | |
| 7,890,767 B2 | 2/2011 | Smith et al. | |
| 7,913,084 B2 | 3/2011 | Medvinsky et al. | |
| 7,917,764 B2 | 3/2011 | Futa | |
| 8,006,289 B2 | 8/2011 | Hinton et al. | |
| 8,024,562 B2 | 9/2011 | Gentry et al. | |
| 8,041,954 B2 | 10/2011 | Plesman | |
| 8,059,820 B2 | 11/2011 | Malaviarachchi et al. | |
| 8,151,116 B2 | 4/2012 | van der Horst et al. | |
| 8,275,356 B2 | 9/2012 | Hickie | |
| 8,332,922 B2 | 12/2012 | Dickinson et al. | |
| 8,370,638 B2 | 2/2013 | Duane et al. | |
| 8,386,800 B2 | 2/2013 | Kocher et al. | |
| 8,387,117 B2 | 2/2013 | Eom et al. | |
| 8,418,222 B2 | 4/2013 | Gbadegesin et al. | |
| 8,423,759 B2 | 4/2013 | Moreau | |
| 8,453,198 B2 | 5/2013 | Band et al. | |
| 8,464,058 B1 | 6/2013 | Chen et al. | |
| 8,464,354 B2 | 6/2013 | Teow et al. | |
| 8,533,772 B2 | 9/2013 | Garg et al. | |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,739,308 B1 | 5/2014 | Roth | |
| 8,745,205 B2 | 6/2014 | Anderson et al. | |
| 8,769,289 B1 | 7/2014 | Kronrod | |
| 8,776,190 B1 | 7/2014 | Cavage et al. | |
| 8,776,204 B2 | 7/2014 | Faynberg et al. | |
| 8,793,774 B1 | 7/2014 | Kumar et al. | |
| 8,868,923 B1 | 10/2014 | Hamlet et al. | |
| 8,892,865 B1 | 11/2014 | Roth | |
| 8,977,857 B1 | 3/2015 | Triscon | |
| 8,997,198 B1 | 3/2015 | Kelley et al. | |
| 2001/0008013 A1 | 7/2001 | Johnson et al. | |
| 2001/0018739 A1 | 8/2001 | Anderson et al. | |
| 2002/0016840 A1 | 2/2002 | Herzog et al. | |
| 2002/0067832 A1 | 6/2002 | Jablon | |
| 2002/0083178 A1 | 6/2002 | Brothers | |
| 2002/0112181 A1 | 8/2002 | Smith | |
| 2002/0161723 A1 | 10/2002 | Asokan et al. | |
| 2002/0161998 A1 * | 10/2002 | Cromer | H04L 63/0428 713/153 |
| 2002/0162019 A1 | 10/2002 | Berry et al. | |
| 2002/0194483 A1 | 12/2002 | Wenocur et al. | |
| 2002/0198848 A1 | 12/2002 | Michener | |
| 2003/0016826 A1 | 1/2003 | Asano et al. | |
| 2003/0041110 A1 | 2/2003 | Wenocur et al. | |
| 2003/0135740 A1 | 7/2003 | Talmor et al. | |
| 2003/0145197 A1 | 7/2003 | Lee et al. | |
| 2003/0149781 A1 | 8/2003 | Yared et al. | |
| 2003/0188117 A1 | 10/2003 | Yoshino et al. | |
| 2004/0088260 A1 | 5/2004 | Foster et al. | |
| 2004/0103096 A1 | 5/2004 | Larsen | |
| 2004/0128505 A1 | 7/2004 | Larsen | |
| 2004/0128510 A1 | 7/2004 | Larsen | |
| 2004/0131185 A1 | 7/2004 | Kakumer | |
| 2004/0143733 A1 * | 7/2004 | Ophir | H04L 29/06 713/153 |
| 2004/0158734 A1 | 8/2004 | Larsen | |
| 2004/0172535 A1 | 9/2004 | Jakobsson et al. | |
| 2005/0036611 A1 | 2/2005 | Seaton et al. | |
| 2005/0043999 A1 | 2/2005 | Ji et al. | |
| 2005/0060580 A1 | 3/2005 | Chebolu et al. | |
| 2005/0080914 A1 | 4/2005 | Lerner et al. | |
| 2005/0132192 A1 | 6/2005 | Jeffries et al. | |
| 2005/0132215 A1 | 6/2005 | Wang et al. | |
| 2005/0166263 A1 | 7/2005 | Nanopoulos et al. | |
| 2005/0235148 A1 | 10/2005 | Scheidt et al. | |
| 2005/0273862 A1 | 12/2005 | Benaloh et al. | |
| 2005/0278547 A1 | 12/2005 | Hyndman et al. | |
| 2006/0070116 A1 | 3/2006 | Park | |
| 2006/0075462 A1 | 4/2006 | Golan et al. | |
| 2006/0094406 A1 | 5/2006 | Cortegiano | |
| 2006/0094410 A1 | 5/2006 | Cortegiano | |
| 2006/0100928 A1 | 5/2006 | Waleczak, Jr. et al. | |
| 2006/0130100 A1 | 6/2006 | Pentland | |
| 2006/0149677 A1 | 7/2006 | Shahine et al. | |
| 2006/0174125 A1 | 8/2006 | Brookner | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0218625 A1 | 9/2006 | Pearson et al. | |
| 2006/0230284 A1 | 10/2006 | Fiske | |
| 2006/0256961 A1 | 11/2006 | Brainard et al. | |
| 2006/0271785 A1 | 11/2006 | Holtmanns et al. | |
| 2006/0282878 A1 | 12/2006 | Stanley et al. | |
| 2007/0005955 A1 | 1/2007 | Pyle et al. | |
| 2007/0033396 A1 | 2/2007 | Zhang et al. | |
| 2007/0037552 A1 | 2/2007 | Lee et al. | |
| 2007/0061571 A1 | 3/2007 | Hammes et al. | |
| 2007/0061885 A1 | 3/2007 | Hammes et al. | |
| 2007/0136361 A1 | 6/2007 | Lee et al. | |
| 2007/0157309 A1 | 7/2007 | Bin et al. | |
| 2007/0174614 A1 | 7/2007 | Duane et al. | |
| 2007/0186102 A1 | 8/2007 | Ng | |
| 2007/0234410 A1 | 10/2007 | Geller | |
| 2007/0250706 A1 | 10/2007 | Oba | |
| 2007/0277231 A1 | 11/2007 | Medvinsky et al. | |
| 2008/0010665 A1 | 1/2008 | Hinton et al. | |
| 2008/0040773 A1 | 2/2008 | Albadarin et al. | |
| 2008/0066150 A1 | 3/2008 | Lim | |
| 2008/0080718 A1 * | 4/2008 | Meijer | G06F 21/6245 380/282 |
| 2008/0083036 A1 | 4/2008 | Ozzie et al. | |
| 2008/0109657 A1 | 5/2008 | Bajaj et al. | |
| 2008/0163337 A1 | 7/2008 | Tuliani et al. | |
| 2008/0168530 A1 | 7/2008 | Kuehr-McLaren et al. | |
| 2008/0182592 A1 | 7/2008 | Cha et al. | |
| 2008/0222694 A1 | 9/2008 | Nakae | |

(56) References Cited

U.S. PATENT DOCUMENTS

| | | |
|---|---|---|
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0204808 A1 | 8/2009 | Guo et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1* | 12/2010 | Asaka .............. H04L 63/061 713/189 |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0264907 A1 | 10/2011 | Betz et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1* | 1/2012 | Blenkhorn ............ G06F 21/602 713/189 |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1* | 12/2012 | Glover .............. G06Q 10/101 713/165 |
| 2012/0331284 A1 | 12/2012 | Kouladjie et al. |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Dirk |
| 2013/0247218 A1 | 9/2013 | Jhingan et al. |
| 2013/0254536 A1* | 9/2013 | Glover .............. G06F 21/6209 713/165 |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1* | 9/2014 | Klausen ............. H04L 63/0471 713/153 |
| 2015/0082039 A1 | 3/2015 | Stalzer et al. |
| 2015/0089614 A1 | 3/2015 | Mathew et al. |

FOREIGN PATENT DOCUMENTS

| | | |
|---|---|---|
| JP | 2005197912 | 7/2005 |
| JP | 2006128873 | 5/2006 |
| JP | 2007053658 | 3/2007 |
| JP | 2011008701 | 1/2011 |
| JP | 2011054028 | 3/2011 |
| KR | 20060091548 | 8/2006 |
| WO | WO2006077822 | 7/2006 |
| WO | WO2008024705 | 2/2008 |
| WO | WO2008089276 | 7/2008 |
| WO | WO2014063361 | 5/2014 |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014, in International Patent Application No. PCT/US2014/057043, filed Sep. 23, 2014.

International Search Report and Written Opinion dated Dec. 30, 2014, in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the Inter-

(56) References Cited

OTHER PUBLICATIONS national Searching Authority, or the Declaration," issued to International Application No. PCT/US2012/058083 dated Dec. 27, 2012.
Roth et al., "Hierarchical Data Access Techniques," U.S. Appl. No. 13/431,882, filed Mar. 27, 2012.
Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.
TCG Published, "TPM Main Part 1 Design Principles," Specification Version 1.2, Revision 116, Mar. 1, 2011, 184 pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 pages.
U.S. Appl. No. 13/431,760, filed Mar. 27, 2012.
U.S. Appl. No. 13/431,898, filed Mar. 27, 2012.
Wang et al., "Extending the Security Assertion Markup Language to Support Delegation for Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.
Japanese Final Rejection for Patent Application No. 2016-542890 dated Dec. 17, 2017, 4 pages.
Japanese Final Rejection, dated Feb. 13, 2018, for Patent Application No. 2016-542891, 12 pages.
Canadian Office Action for Patent Application No. 2,923,438, dated Nov. 22, 2017, 4 pages.
Canadian Office Action for Patent Application No. 2,923,437 dated Mar. 27, 2018, 4 pages.
Chinese First Office Action for Patent Application No. 201480052715.X, dated May 3, 2018, 16 pages.
Chinese First Office Action for Patent Application No. 201480052720.0, dated May 2, 2018, 15 pages.
European Communication pursuant to Article 94(3) EPC for Application No. 14849276.2 dated Apr. 3, 2018, 5 pages.

* cited by examiner

US 10,037,428 B2

DATA SECURITY USING REQUEST-SUPPLIED KEYS

CROSS REFERENCE TO RELATED APPLICATIONS

This application is a continuation of U.S. patent application Ser. No. 14/037,292, filed on Sep. 25, 2013, entitled "DATA SECURITY USING REQUEST-SUPPLIED KEYS," the content of which are incorporated by reference herein in their entirety. This application also incorporates by reference for all purposes the full disclosure of U.S. patent application Ser. No. 14/037,282, filed Sep. 25, 2013, issued as U.S. Pat. No. 9,237,019, entitled "RESOURCE LOCATORS WITH KEYS."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
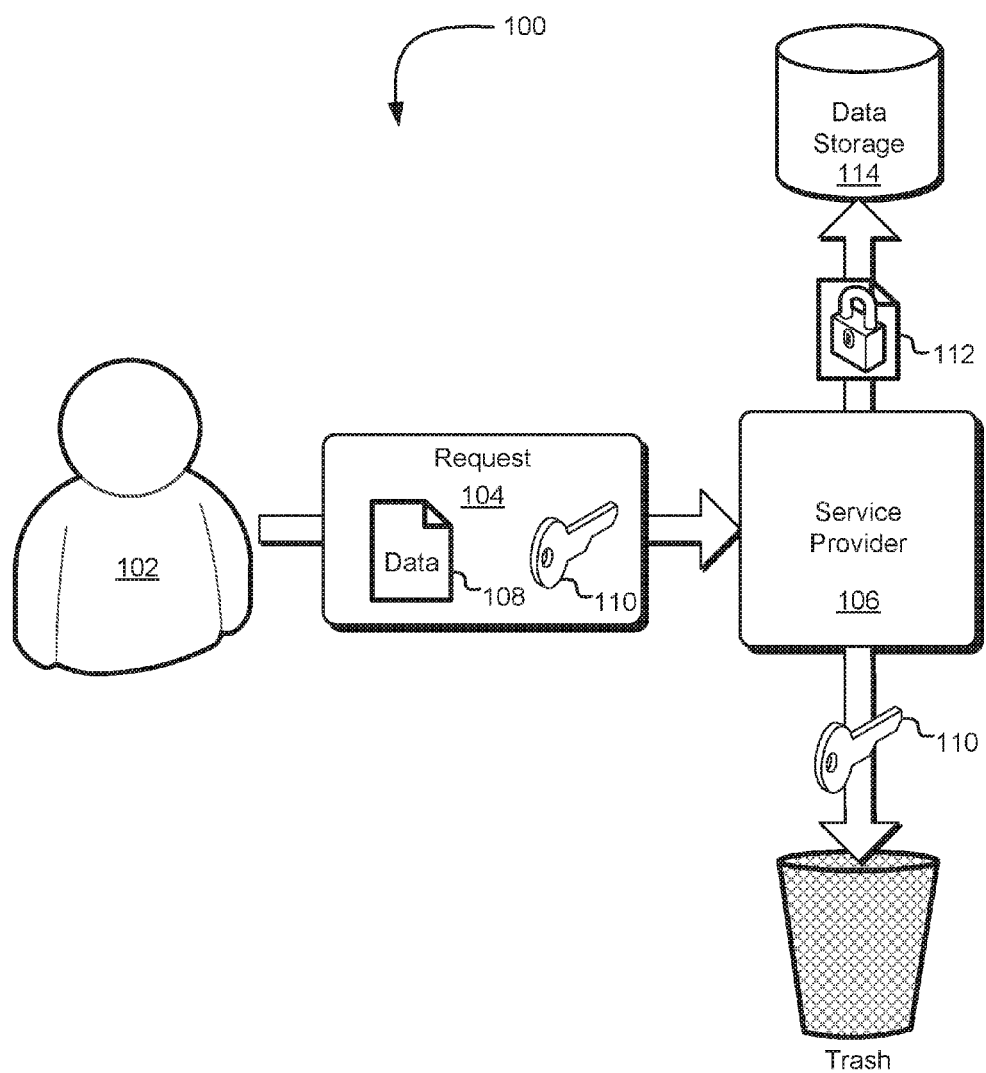
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the submission and processing of requests where the requests include cryptographic keys. The requests may be generated by and submitted from customers of a service provider, such as a computing resource service provider. Processing the requests may include use of the keys included in the requests to perform one or more cryptographic operations such as encryption, decryption and generation of electronic (digital) signatures on data. In some embodiments, the techniques described and suggested herein are used to enable server-side encryption (and/or related techniques such as decryption) where the key to be used for encryption/decryption is controlled by the client (i.e. device of the customer or operating on behalf of the customer).

In various embodiments, use of keys provided in requests is performed so that, except for a limited time during which the keys are used, the service provider lacks access to the key. For example, the service provider may operate a data storage service. A customer may transmit data to the service provider for storage by the data storage service. A request to the service provider may include a key to be used to encrypt the data. The service provider may obtain the key from the request and use the key to encrypt the data so that the encrypted data may be persistently stored using the data storage service. When the key is no longer needed (e.g., when encryption of the data has completed), the service provider may perform one or more operations to lose access to the key, such as by destroying or allowing to be destroyed any in-memory copies of the key. Any copies of the data in plaintext form may similarly be destroyed or allowed to be destroyed. Once the key and plaintext data has been destroyed, the customer can be assured that the provider is unable to decrypt the data. Thus, even if a security breach or other event at the provider causes access to the data not authorized by the customer, the breach by itself does not enable access to the data in plaintext form.

Keys may be provided in requests in various ways in accordance with different embodiments. For example, in some embodiments, the request includes the key in plaintext form. The plaintext key may be a symmetric key to be used in a symmetric key algorithm. The plaintext key may also be a public key of a public-private key pair for an asymmetric key algorithm, where the service provider lacks access to the private key of the key pair and the private key is accessible to an entity to be able to decrypt using the private key (e.g., the customer). In some embodiments, requests include keys in encrypted (wrapped) form. For example, the key may be encrypted so as to be decryptable by the service provider or another entity at the direction of the service provider. The key used to encrypt the key in the request may be a secret shared with an entity able to decrypt the key (e.g., service provider) or a public key of a public-private key pair where the private key is to be used by an entity to decrypt the encrypted key for processing the request.

Upon receipt of a request with a key, the service provider may access the key from the request, decrypting or causing to be decrypted, if applicable, and then process the request. Other operations may be performed, such as by verifying an electronic signature of the request or checking whether fulfillment of the request is in compliance with any applicable policy. Other details of operations that may be performed are discussed in more detail below.

FIG. 1 shows an illustrative example of an environment 100 in which various embodiments can be implemented. In the environment 100 a customer 102 transmits a request 104 to a service provider 106. The customer 102, for example, may utilize services of the service provider 106. The service provider may provide any type of service relating to data which may be utilized by customers. Example services include data storage services, database services, services that process data and others. To submit a request 104 to the service provider 106 the customer 102 may transmit the request with the aid of one or more devices of the customer, such personal or laptop computers, mobile devices, tablet computing devices, electronic book readers and/or others as described in more detail below in connection with FIG. 15. In addition, the request 104 may be submitted in accordance with one or more automated processes of the customer 102. For example, request 104 may be transmitted as a result of a human operator of a device of the customer 102 having interacted with a browser or other application on a device of the customer 102. The request 104 may be an electronic request transmitted over a network, such as the Internet or any other network or combination of networks discussed below. In some embodiments, for example, the request 104 is a web service request to a web service interface provided by the service provider 106. Generally, the request 104 may be configured in accordance with various protocols by which requests may be electronically submitted.

As illustrated in FIG. 1, the request 104 includes data 108 and a cryptographic key 110. The data may include various types of information and may be formatted various ways in accordance with various embodiments. For example, in some embodiments, the data is organized as a file, such as a media file. Data may also be formatted in other ways. The data may be, for instance, organized for inclusion in a database or otherwise. The cryptographic key 110, as discussed in more detail below, may be a key used to encrypt the data 108 or otherwise to perform one or more cryptographic operations on data. It should be noted, as will be discussed in more detail below, that the request 104 may also include the cryptographic key 110 in various ways. For example, in some embodiments, the request 104 includes the cryptographic key 110 in plaintext form. In other embodiments, the request 104 includes the cryptographic key in encrypted form. For example, as discussed in more detail below, the cryptographic key 110 may be encrypted by another key such that the service provider 106 or another system associated therewith is able to decrypt the encrypted cryptographic key 110. In this manner, upon submission of the request 104 from the customer 102 to the service provider 106, the service provider 106 may use the cryptographic key 110 to encrypt the data 108 received in the request 104 thereby generating encrypted data 112.

The encrypted data 112 may then be stored in a data storage system 114. The data storage system 114 while illustrated as separate from the service provider 106 may be a subsystem of the service provider 106. For example, the request 104 may be submitted to a web server of the service provider 106 where the web server is configured to allow access to the data storage system 114. Generally, the data storage system 114 may be operated as a service to customers such that customers can use resources of the service provider 106 for the purpose of storing data. Other embodiments also include those in which the data storage system 114 is separate from the service provider 106. The data storage system 114 may, for example, be operated by an entity that is a third party to the service provider 106 and the customer 102, or in some embodiments the data storage system 114 may be a subsystem of the customer 102; that is, a subsystem of a system of the customer 102. It should be noted that terms such as "customer" and "service" provider can have multiple meanings and such meanings are clear from context. For example, the term "customer" may refer to an entity (e.g., a legal entity such as an organization or individual) or a system (e.g., computing device or network of computing devices) that support operations of a customer entity. Similarly, the term "service provider" may refer to a legal entity or a system supporting operations of a service provider entity.

As illustrated in FIG. 1, upon encryption of the data 108 to generate the encrypted data 112, the service provider 106 may take one or more actions that cause the service provider 106 to lose access to the cryptographic key 110. This is illustrated in FIG. 1 as the service provider 106 passing the cryptographic key 110 to an icon labeled as trash. It should be noted that while passing the cryptographic key 110 into trash as illustrated in the figure for the purpose of illustration, various embodiments may take action to lose access to the cryptographic key 110 that do not necessarily involve the transmission of the cryptographic key 110. For example, in some embodiments, upon receipt of the request 104 and use of the cryptographic key 110 the service provider 106 may perform one or more operations to destroy the cryptographic key 110. Destruction of the cryptographic key 110 may be performed in various ways in accordance with various embodiments. For example, in some embodiments, the cryptographic key 110 and request 104 are not persistently stored by the service provider 106 but are maintained in volatile memory of a device of a service provider 106.

Destruction of the cryptographic key 110 may be performed by allowing one or more memory locations that store the cryptographic key 110 to be overwritten with other data, such as data received as part of subsequent requests. Other operations may also be performed. For example, if the cryptographic key 110 is stored in volatile or nonvolatile memory, the cryptographic key 110 may be destroyed by overwriting (e.g., via one or more write operations intended to destroy the cryptographic key) one or more memory locations used to store the cryptographic key 110 with other data such as random data or nonrandom data such as a string of zeros. Generally, any operations that will cause the service provider 106 to lose access to the cryptographic key 110 may be used. In this manner, the customer 102 is able to submit requests to the service provider 106 with cryptographic keys that the customer 102 desires to be used to encrypt data 108. Further, because the service provider 106 is, in various embodiments, configured to lose access to the cryptographic key 110 after use of the cryptographic key 110, the customer 102 can be assured that the service provider, upon processing the request 104, is unable to access the data 108 by decrypting the decrypted data 112. In other words, the security of the data 112 is ultimately controlled by the customer 102 with the service provider 106 having access to the data for a limited time.

It should be noted that while various processes resulting in encrypted data (and corresponding decrypting data) are used throughout for the purpose of illustration, the various processes may vary in accordance with other embodiments. For example, example processes for encryption illustrated herein show encryption using a key supplied by a customer of a service provider and where encryption is performed such that after an amount of time the service provider loses access to the key that was used. However, more complex schemes may also be used where more than one key is used to control access to data. For example, referring to FIG. 1, in some embodiments, data may be encrypted using both a key supplied by the customer in a request as well as a key held by or otherwise accessible to the service provider. In this manner, coordinated action between the customer 102 and the service provider 106 is required for access to the data 108 by way of having an ability to decrypt the encrypted data. In some embodiments, for example, the data 108 may be encrypted with one key and then again encrypted with another key. In other examples, the cryptographic key 110 may be combined with another key to generate yet another key used to encrypt the data 108. Such variations may also be extended to multiple parties in addition to the customer 102 and the service provider 106 so that generally coordinated action by a plurality of entities is required for legitimate access to data that has been encrypted, that is to the data in plaintext form. Other variations are also considered as being within the scope of the present disclosure.

In addition, while various embodiments described herein illustrate requests that have certain types of data, requests may include other types of data. For example, requests my include data for various parameters of the request which may be used by a service provider to determine if, and/or how to, fulfill a request. Generally, requests as discussed herein are simplified for the purpose of illustration. The requests may, for instance, include various contextual data such as an identity of a requestor, a network address from which the request originates, an identity of an entity that generated some or all of the request and/or other types of data.

Further, it should also be noted, that while FIG. 1 shows the request 104 having data 108 to be encrypted, requests within the scope of the present disclosure do not necessarily have data to be encrypted. For example, in some embodiments the requests may have a reference to data (e.g., an identifier of a data object, which may be in the form of a URL) that is not necessarily included in the request. Processing such a request may include using the reference to obtain the data. As another example, some requests may lack data because the requests include retrieval of data as one or more requested operations. A request to retrieve data may include a cryptographic key, but the data may be stored in another location. Processing the request may include accessing encrypted data to decrypt using the cryptographic key provided in the request. Other variations are also considered as being within the scope of the present disclosure.

Figure 2:
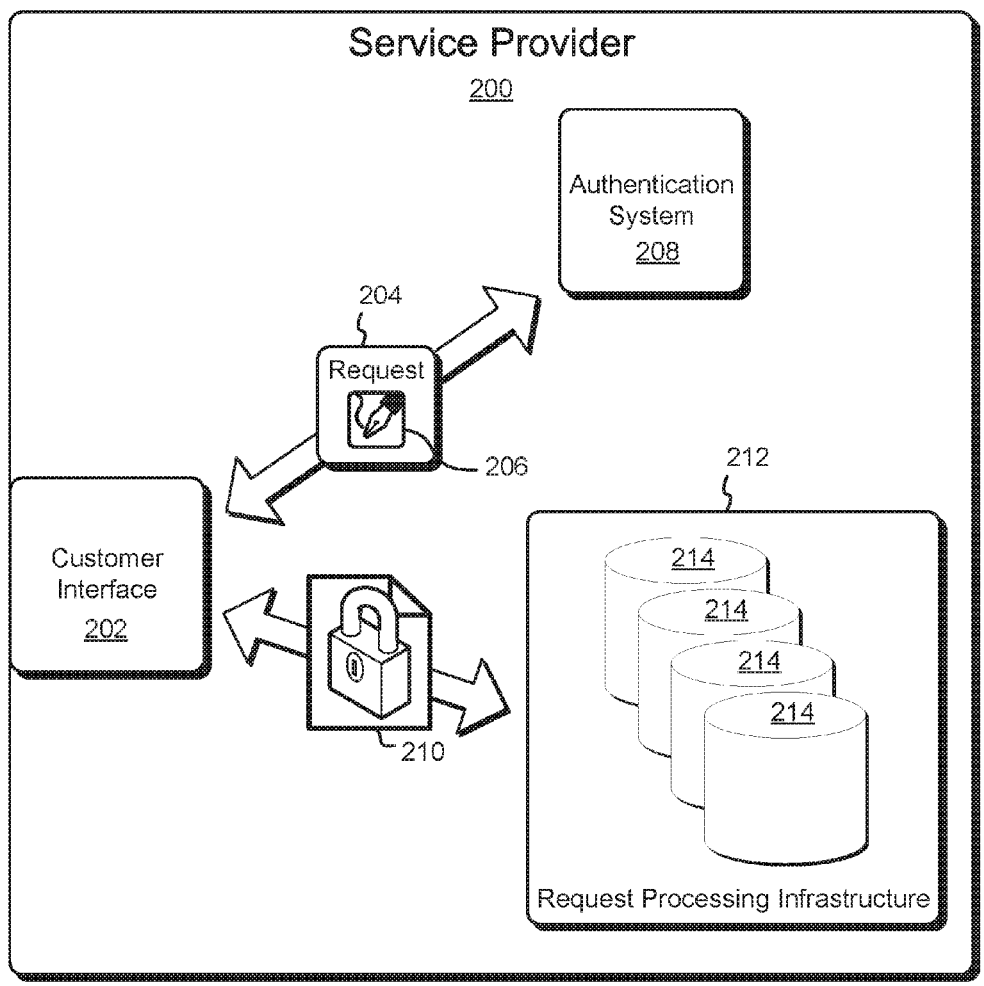
FIG. 2 shows an illustrative example of an environment in which various embodiments can be implemented.

FIG. 2 shows an illustrative example of an environment of a service provider 200 in accordance with various embodiments. As illustrated in FIG. 2, the service provider 200 includes a customer interface 202. The customer interface may be a subsystem of the service provider 200 which allows for the submission of requests from customers to be processed by the service provider 200 such as described above in connection with FIG. 1. The customer interface may accordingly include appropriate computing devices for providing the ability for customers to submit requests to the service provider 200. This customer interface, for example, may include one or more web servers configured to receive requests over the internet or another network. While not illustrated as such, other infrastructure may also be included in the customer interface 202, such as appropriate networking equipment that enable the customer interface 202 to operate suitably for the customer of the service provider 200.

When a request is received through the customer interface 202, the request may be received with appropriate authenticating information. For example, as illustrated in FIG. 2, a request 204 may be received with a signature 206 of the request. The signature may be generated in accordance with various embodiments. For example, a customer that submitted the request 204 may generate the signature 206 using secret information shared between the customer and the service provider 200. As another example, a customer may have used an asymmetric digital signature scheme to sign the request 204 using a private key of a private/public key pair. Generally, any type of information which is used to authenticate the request 204 may be used and, in some embodiments, requests may be submitted without such information. Further, in some embodiments, the electronic signature of a request is generated using a cryptographic key that is different than a cryptographic key supplied in the request, although in some embodiments, the electronic signature is generated using the same key that is supplied in the request.

As illustrated in FIG. 2, however, when a request 204 is received through the customer interface 202, the request 204 is provided (e.g., over an internal network of the service provider 200) with the signature 206 to an authentication system 208 of the service provider 200. Alternatively, a portion of the request sufficient for generating the electronic signature 206 may be provided instead of the whole request. The authentication system 208 may be a subsystem of the service provider 200 configured to authenticate requests such as by verifying electronic signatures provided with requests. Upon verifying the signature 206 of the request 204 the authentication system 208 may provide a response to the customer interface 202 that indicates whether the signature 206 is valid. A device of the customer interface 202 may use the information provided by the authentication system 208 in order to determine how to process the request 204. For example, if the authentication system 208 indicates that the signature 206 is invalid, the customer interface 202 may deny the request. Similarly, if the information from authentication system 208 indicates that the signature 206 of the request 204 is valid, the customer interface 202 may cause the request 204 to be processed.

While not illustrated in the figure, the authentication system 208 or another system operating within or on behalf of the service provider 200 may operate to perform other operations in connection with determining how to process requests. For example, the authentication system 208 or another system operating in cooperation therewith may be used to check one or more policies which may be determinative of whether the request can be fulfilled. Policy determinations may be made based at least in part on various factors such as an identity of the requestor that submitted the request, a time of day, a logical identifier for a location in which data is stored or is to be stored and other contextual information. Policy may be managed through the customer interface 202 or another interface through appropriately-configured application programming interface (API) calls.

Returning to the embodiment illustrated in FIG. 2, if the authentication system 208 determines that the signature 206 is valid, the customer interface 202 may determine to process the request. Processing the request may involve the transfer of encrypted data 210 between the customer interface 202 and request processing infrastructure 212. The request processing infrastructure 212 may comprise one or more devices that collectively operate to provide a service of the service provider 200. For example, as illustrated in FIG. 2, the request processing infrastructure may comprise a plurality of data storage system 214 used to store data on behalf of customer of the service provider 200. Other infrastructure including networking infrastructure while not illustrated may also be included. The passage of data, e.g., over a network between the customer interface 202 and the request processing infrastructure 212 may occur in various ways in accordance with various embodiments in accordance with the various types of requests that may be submitted through the customer interface 202. For example, if the request 204 is a request to store data, a customer interface may utilize a key provided in the request 204 to encrypt the data and transmit the encrypted data 210 to the request processing infrastructure 212 for storage in one or more of the data storage systems 214.

Similarly, if the request 204 is a request to retrieve data, a customer interface 202 may transmit a communication to the request processing infrastructure 212 that allows data from one or more of the data storage systems 214 to be provided to the customer interface 202. The customer interface 202 may then use a key provided in the request 204 to decrypt the encrypted data 210 and provide the decrypted data to the customer that submitted the request 204. It should be noted that the environment of the service provider 200 illustrated in FIG. 2 is simplified for the purpose of illustration and that numerous other devices and subsystems such as accounting systems that keep track of usage of the service provider 200 by customers may also be included. Further, a service provider 200 may include facilities located in different geographical locations for the purpose of redundancy and/or availability.

Figure 3:
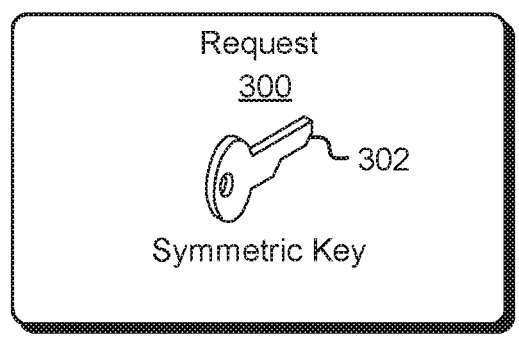
FIG. 3 shows an illustrative example of a representation of a request in accordance with at least one embodiment.

FIG. 3 shows an illustrative example of a request 300 in accordance with various embodiments, where the request may be a request such as described above in connection with FIGS. 1-2. As illustrated in the example shown in FIG. 3, the request 300 includes a symmetric key which may be a cryptographic key used for both encryption and decryption of data. In an embodiment, the symmetric key 302 of the request 300 is provided in the request 300 in plaintext form. It should be noted that while the symmetric key is provided in the request 300 in plaintext form in some embodiments, the transfer of a request from a customer to a service provider or generally between entities may involve various protocols to ensure security of any data in the request 300. For example, transmission of the request 300 may involve transport layer security (TLS) and/or another protocol such that the symmetric key 302 is encrypted during transmission from one entity to the other. Further, while FIG. 3 shows a request 300 having a symmetric key 302 the request 300 may include other data which is not illustrated in the figure. Such data as discussed above may include various request parameters, authentication information, data to be encrypted, and/or other information.

In addition, while FIG. 3 shows a request with a key, as with all requests described and illustrated herein, various other data may be provided within the request, such as data to be operated on and/or various metadata including contextual information about the request and authentication information usable to verify authenticity of the request. Various request parameters may also be included in the request. For instance, a request parameter may specify that server side encryption is supposed to be used to encrypt data using a key provided with the request. If such a parameter is absent and/or indicates that server side encryption is not to be used, the request may be processed without encryption being performed regardless of whether a key is included in the request. Further, for requests submitted with electronic signatures, a parameter may specify which part of the request was used to generate an electronic signature. Such a parameter can indicate which part of a request should be used for checking an electronic signature, thereby enabling requests to be modified after their generation, such as by adding data to be operated on during fulfillment of the request. Generally, requests are simplified in the present disclosure for the purpose of illustration.

Figure 4:
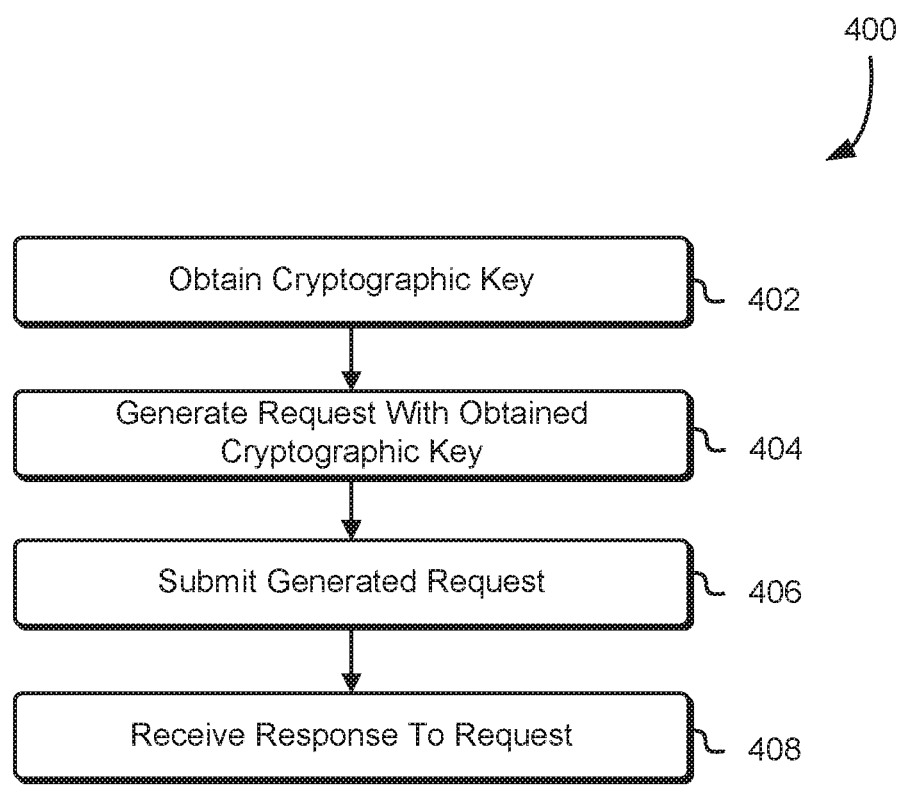
FIG. 4 shows an illustrative example of a process for submitting a request in accordance with at least one embodiment.

FIG. 4 shows an illustrative example of a process 400 which may be used to transmit and receive a response to a request in accordance with various embodiments. The process 400 may be performed by any suitable system such as a device of a customer such as described above and below in connection with FIG. 15. In an embodiment, the process 400 includes obtaining 402 a cryptographic key. The cryptographic key may be obtained 402 in various ways in accordance with various embodiments. For example, in some embodiments the cryptographic key is obtained 402 by generating the cryptographic key. The cryptographic key may be generated for example using a random number generator or a key derivation function such as public key derivation function 2 (PPKDF2) or Bcrypt. The cryptographic key may be obtained 402 in other ways as well. For example, the cryptographic key may be accessed from a data storage device. As another example, the cryptographic key may be a password, passphrase, or other type of passcode accessed from memory and/or input by a user of a system performing the process 400. Generally, any way of obtaining 402 a cryptographic key may be used.

With the cryptographic key having been obtained 402, the process 400 may include generating 404 a request with the obtained cryptographic key; that is, generating a request that includes the obtained cryptographic key. The request may be generated by arranging data for the request in a manner suitable for transmission that is in a format processable by a system to which the request will be submitted. Once generated 404, the generated request may be submitted 406. Submission 406 of the generated request may be performed in any suitable manner such as by transmission to an Internet protocol (IP) address of a webserver configured to receive generated requests. Other operations may be performed, for example, in some embodiments the request is generated from a uniform resource locator (URL). Communication with the domain name service (DNS) may occur to obtain an IP address for the system to which the generated request is then submitted 406. Generally any way of submitting the request may be performed.

Upon submission, a request may be processed by a system to which the generated request was submitted 406. Accordingly, the process 400 may include receiving 408 a response to the request or the response may be an appropriately configured response in accordance with a protocol by which the request was submitted. It should be noted that not all embodiments require receipt of a response to the request. For example, some protocols may allow for the submission of requests without acknowledgement that the request has been received and/or fulfilled. As an illustrative example, the request may be to store data. In some embodiments, upon submission it may be assumed that the request has been processed or likely had been processed where acknowledgement of processing of the request may not be required.

Figure 5:
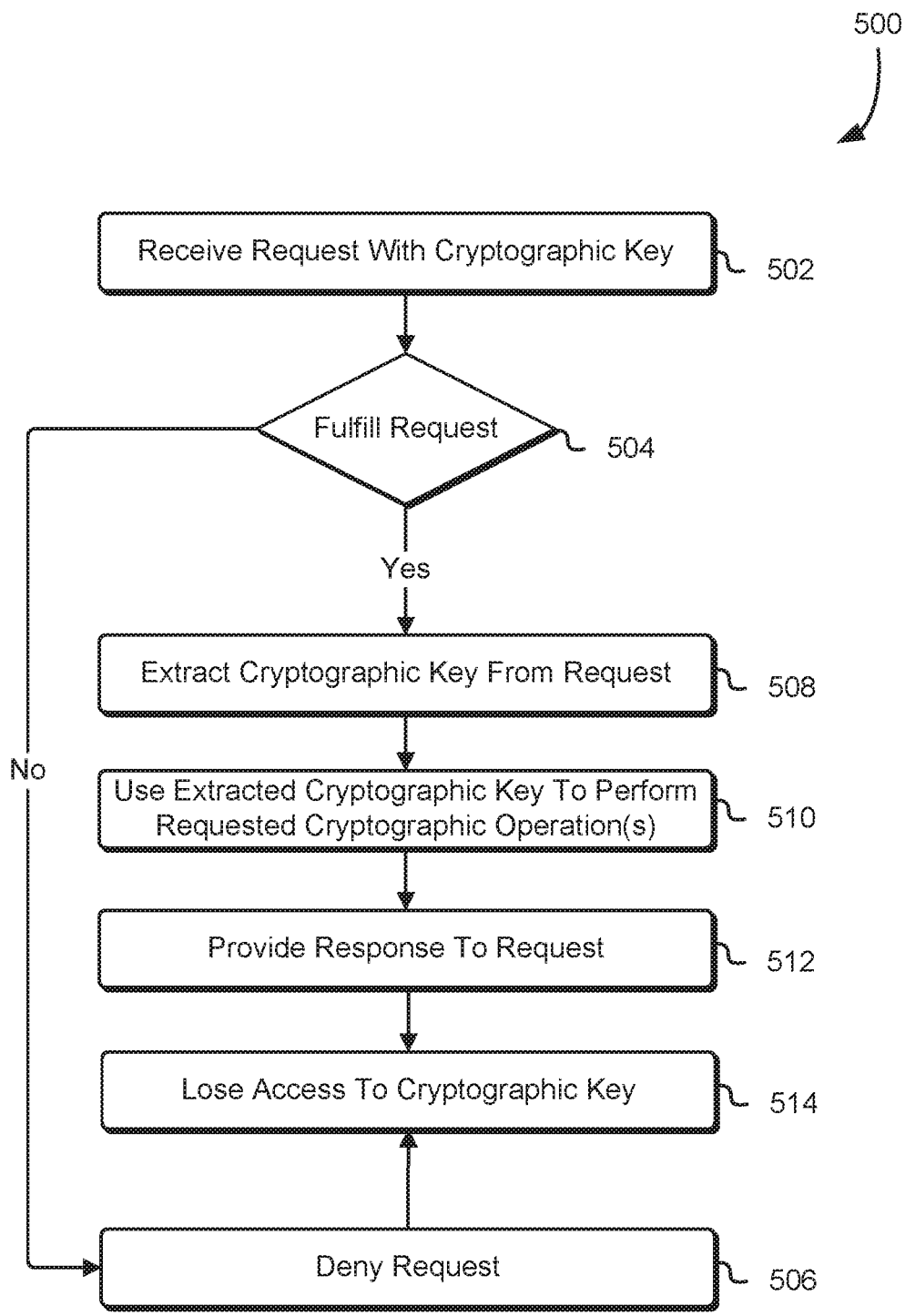
FIG. 5 shows an illustrative example of a process for processing a request in accordance with at least one embodiment.

FIG. 5 shows an illustrative example of a process 500 for processing a request where the request may be received such as described above and may have been submitted in accordance with a process such as the process 400 such as described above. The process 500 may be performed by any suitable system such as by a device (e.g., server) operating to provide a customer interface such as described above. In an embodiment, the process 500 includes receiving 502 a request with a cryptographic key. The request may be received 502 in various ways in accordance with various embodiments. For example as noted above, the request may be submitted over a network in accordance with a communication protocol and the request may therefore be received in accordance with such a protocol. Generally the request may be received 502 in any suitable way.

Upon receipt of the request, the process 500 may include determining 504 whether to fulfill the request. The determination 504 whether to fulfill the request may be made in various ways in accordance with various embodiments. For example as noted above, in some instances the request may be received with an electronic signature of the request. Accordingly, a determination may be made by determining whether the signature is valid. Determination of whether the signature is valid may be performed in various ways. For example, the system performing the process 500 may verify the signature itself or may transmit the signature and request (or generally data signed to generate the signature) to another system operable to verify the electronic signature. Further as noted above, determining 504 whether to fulfill the request may include performing a determination whether one or more policies would preclude fulfillment of the request. Generally any way by which a determination of whether to fulfill the request may be performed.

In addition, while FIG. 5 and other processes illustrated herein show determinations whether to fulfill the request, in various embodiments, systems may fulfill all appropriately configured requests without the need to have a valid electronic signature and/or compliance with policy. Returning to the embodiment illustrated in FIG. 5, if it is determined 504 not to fill the request such as if a signature is invalid and/or policy precludes fulfillment of the request, the process 500 may include denying 506 the request. Denying 506 the request may be performed in various ways in accordance with various embodiments. For example, a response to the request may be provided that indicates that the request is denied and/or that provides information why the request was denied. As another example, denying the request may simply be performed by not taking any action. That is by not providing a response to the request and simply not fulfilling the request. Generally any way in which the request may not be fulfilled may be considered as denying the request.

If it is determined, however, to fulfill the request, the process 500 may include extracting 508 a cryptographic key from the request. The extracted cryptographic key may then be used 510 to perform one or more requested cryptographic operations; that is to perform one or more cryptographic operations involved in fulfillment of the request. The one or more cryptographic operations may vary in accordance with various embodiments and in accordance with the type of request that was received. In some embodiments for example, the one or more cryptographic operations include encryption of data included with the request and/or encryption of other data. As another example, the one or more cryptographic operations may include decryption of data referenced by and/or provided in the request. Generally any type of cryptographic operations such as key derivation and/or electronic signature generation and/or verification may be performed as part of the one or more cryptographic operations. Further, while various illustrative embodiments described herein show a single cryptographic operation such as encryption, multiple types of cryptographic operations may be performed while fulfilling a single request. As an example, one or more keys provided in a request may be used to encrypt data and generate an electronic signature of the data and/or encrypted data where the electronic signature can be used for later validation that the data has been changed. Other variations are also considered as being within the scope of the present disclosure.

Upon performance of the one or more cryptographic operations, the process 500 may include providing 512 a response to the request. The response may vary in accordance with the various embodiments and in accordance with the type of request that was made. For example, if the request was to retrieve data, the response may include data that was retrieved and decrypted. If the request was to store data, the response may be an acknowledgement that the data has been stored. A check sum or other validation information may be provided with the response. At some point subsequent to performance of the one or more cryptographic operations involved in fulfillment of the request, the process 500 may include losing 514 access to the extracted cryptographic key where access may be lost in various ways such as described above.

Figure 6:
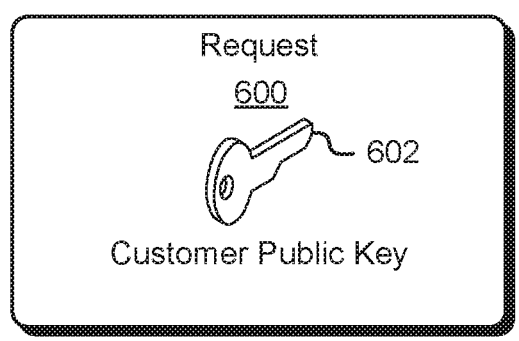
FIG. 6 shows an illustrative example of a representation of a request in accordance with at least one embodiment.

FIG. 6 is an illustrative example of a request 600 in accordance with various embodiments. As illustrated in FIG. 6, unlike the request described above in connection with FIG. 3, the request 600 includes a customer public key 602 which may be a public key of a public/private key pair where the private key is held by or on behalf of the customer. As with other requests described herein, the request 600 may include other data such as described above. The request 600 may be submitted such as described above in connection with FIG. 4.

Figure 7:
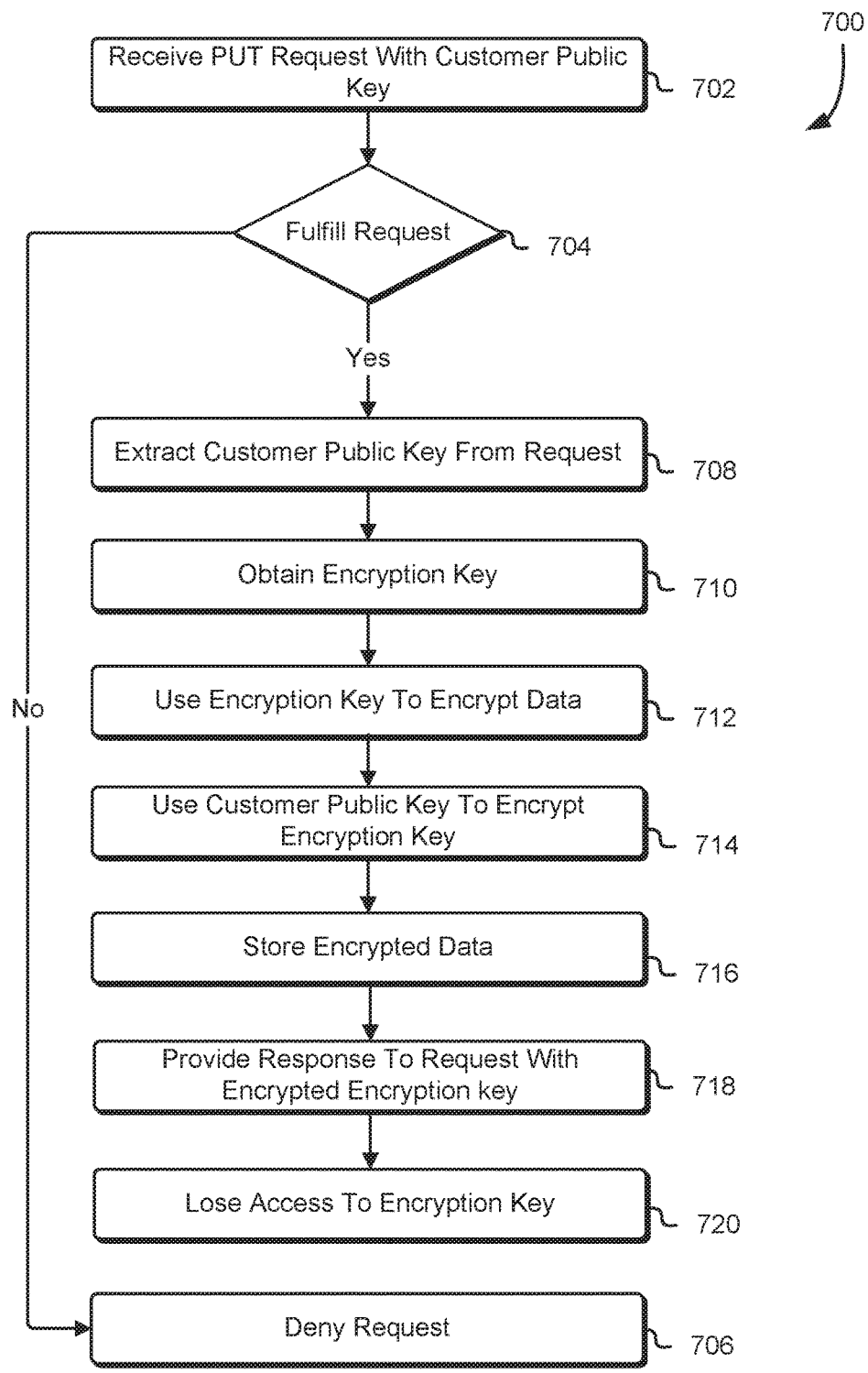
FIG. 7 shows an illustrative example of a process for processing a PUT request in accordance with at least one embodiment.

FIG. 7 shows an illustrative example of a process 700 which may be used to process a request that includes a customer public key such as described above in connection FIG. 6. The process 700 may be performed by any suitable system, such as a system providing a customer interface such as described above. As illustrated in FIG. 7, the process 700 includes receiving 702 a PUT request with a costumer public key; that is a PUT request (i.e., a request to store data) that has, as part of the request, a customer public key. The request may be received 702 such as described above and generally in any suitable manner. Upon receipt 702 of the PUT request with the customer public key the process 700 may include determining 704 whether to fulfill the request where the determination whether to fulfill the request may be made such as described above. If it is determined 704 that the request should not be fulfilled, the process 700 may include denying 706 the request such as described above. If, however, it is determined 704 that the request should be fulfilled, the process 700 may include extracting 708 a customer public key from the request for use. In an embodiment, the process 700 includes obtaining 710 an encryption key where the encryption key may be a symmetric key such as described above. The encryption may be obtained 710 in any suitable manner such as described above. For example, the encryption key may be accessed from data storage or generated. The obtained 710 encryption key may be used 712 to encrypt data that was provided in the request or otherwise requested by the request to be encrypted. The customer public key may be used 714 to encrypt (wrap) the encryption key. In this manner, the encrypted encryption key is decryptable using a private key corresponding to a customer public key. Thus, if a provider performing the process 700 does not have access to the encrypted encryption key, the provider cannot decrypt the encrypted encryption key.

The process 700 may also include storing 716 the encrypted data. The encrypted data may be, for example, transmitted to a data storage system for persistent storage thereof. A response to the request may be provided 718 where the response may include the encrypted encryption key. A system performing the process 700 may lose 720 access to the encryption key such as described above. In this manner, once a system performing the process 700 loses 720 access to the encryption key, the system no longer has the ability to decrypt the encrypted data and generally use of a private key corresponding to the customer public key is necessary to legitimately (i.e., without guessing the key or otherwise obtaining access to the data in an unauthorized manner) decrypt the encrypted data by first decrypting the encryption key in order to decrypt the decrypted data.

It should be noted, as with all processes described herein, variations are considered as being within the scope of the present disclosure. As an example, FIG. 7 shows a process for processing a PUT request where the request includes a customer public key. Such request can be processed in different ways in accordance with various embodiments. In some embodiments for example, although use of a symmetric encryption key is generally computationally more efficient, a customer public key may be used to encrypt the data that was received in the request instead of using an encryption key that is then wrapped by the public key. In this manner, the data is decryptable only by an entity having access to the private key corresponding to the customer public key, which in various embodiments may be only the customer that submitted the request.

As another example of a variation considered as being within the scope of the present disclosure, the encrypted encryption key may be stored with the encrypted data and may or may not be transmitted in a response to the request. In such an embodiment to decrypt the data, the encryption key may be accessed from storage provided to an entity able to decrypt the encryption key (e.g., customer having a private key usable to decrypt the encryption key) which may then provide the decrypted encryption key back to enable decryption of the data. For example, a customer request to retrieve data may cause a provider to transmit an initial response with notification (including the encrypted encryption key) that the encryption key needs decrypting. The customer may decrypt the encryption key and provide the decrypted encryption key back to the provider to enable the provider to decrypt the encrypted data and provide the decrypted data to the customer. Other variations, including variations where ciphertext is provided to the customer from the provider along with an encrypted key usable to decrypt the ciphertext, are also considered as being within the scope of the present disclosure. For embodiments where, for example, server side encryption is used to PUT requests but client side encryption is used to obtain access to stored data, a provider may provide instructions for properly processing data (e.g., by properly canonicalizing data for decryption) or may provide executable instructions in the form of a client library to ensure that decryption is performed correctly (i.e., to ensure that decryption is performed in a manner that will succeed in decrypting the data).

Figure 8:
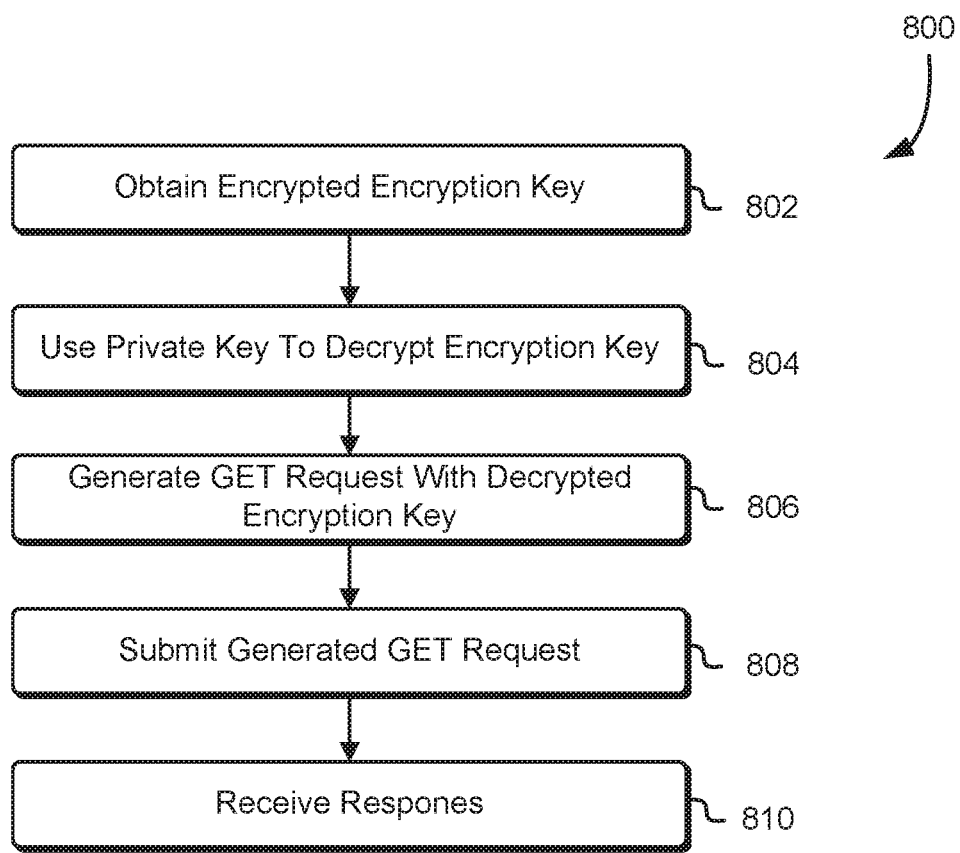
FIG. 8 shows an illustrative example of a process for submitting a GET request in accordance with at least one embodiment.

FIG. 8 shows an illustrative example of a process 800 for obtaining data that has been stored in encrypted form by another system such as by a provider such as described above. The process 800 may be performed by any suitable system, such as by a device of a customer of a provider such as described above. In an embodiment, the process 800 includes obtaining 802 an encrypted encryption key. For example, the encrypted encryption key may have been received pursuant to performance of the process 700 described above or a variation thereof. Obtaining the encrypted encryption key may include receiving the encrypted encryption key or accessing the encrypted encryption key from persistent data storage. Generally the encrypted encryption key may be obtained 802 in any suitable manner.

A private key corresponding to a public key used to encrypt the encryption key may be used 804 to decrypt the encrypted encryption key. Once the decrypted encryption key has been obtained, the process 800 may include generating 806 a GET request with the decrypted encryption key and submitting (e.g., transmitting) 808 the generated GET request, such as described above. A system that receives the GET request may process the request by using the encryption key in the request to decrypt data that was encrypted by the encryption key. A response may then be received 810 where the response may include appropriate information such as data that has been decrypted using the decrypted encryption key that was provided in the GET request.

As with all processes described herein, variations of the process 800 are considered to be within the scope of the present disclosure. For example, the encrypted encryption key may be obtained by accessing the encrypted encryption key from remote storage when the encrypted encryption key is stored with the data that is encrypted under the encrypted encryption key. As another example, in some embodiments the process 800 may include submitting a GET request that is fulfilled by providing data encrypted under the encrypted encryption key. A system performing the process 800 may obtain the encrypted data and use the decrypted encryption key to decrypt the encrypted data. In other words, the process 800 may be modified so that data is decrypted client-side even if the data was encrypted server-side.

Figure 9:
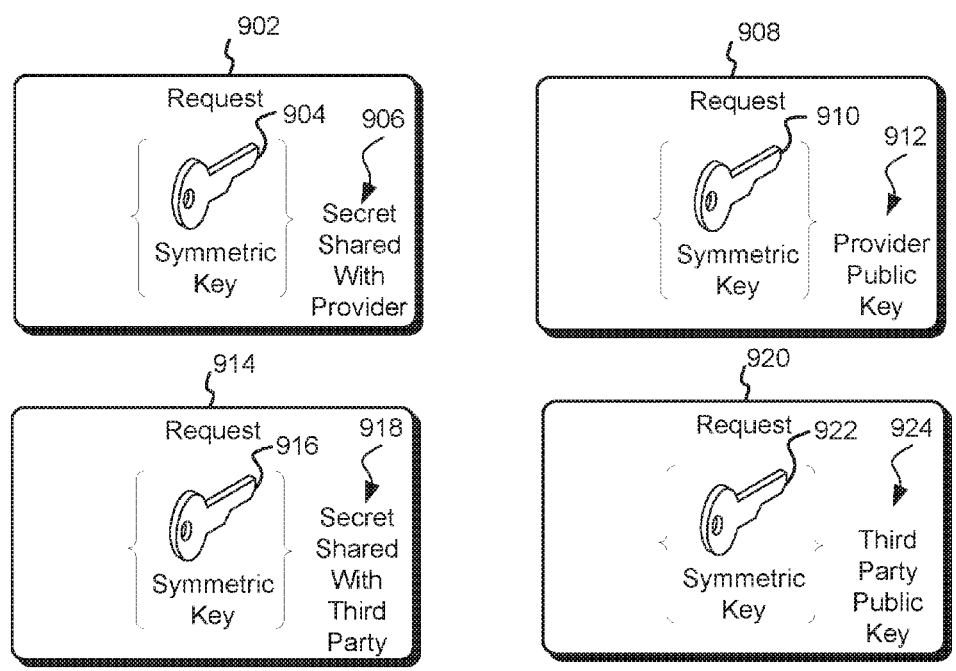
FIG. 9 shows illustrative examples of a representations of requests in accordance with various embodiments.

FIG. 9 shows an illustrative example of various requests that may include cryptographic keys that have been wrapped (i.e., encrypted) in various forms in accordance with various embodiments. For example, FIG. 9 shows an illustrative example of a request 902 having a symmetric key 904 encrypted under a secret 906 shared with a provider where the secret shared with the provider may be another symmetric key shared between the customer and the provider. As another example, FIG. 9 shows an example of a request 908 that includes a symmetric key 910 encrypted under a provider public key 912 which may be a public key corresponding to a public private key pair of which the provider has access to a corresponding private key. Another request 914 includes a symmetric key 916 encrypted under a secret 918 shared with a third party. That is an entity that is a third party to both a customer and a provider. As yet another example, FIG. 9 shows a request 920 having a symmetric key 922 encrypted under a public key 924 of a third party where the third party may be a third party to a customer and provider. As noted, the requests illustrated in FIG. 9 may also include additional information.

Figure 10:
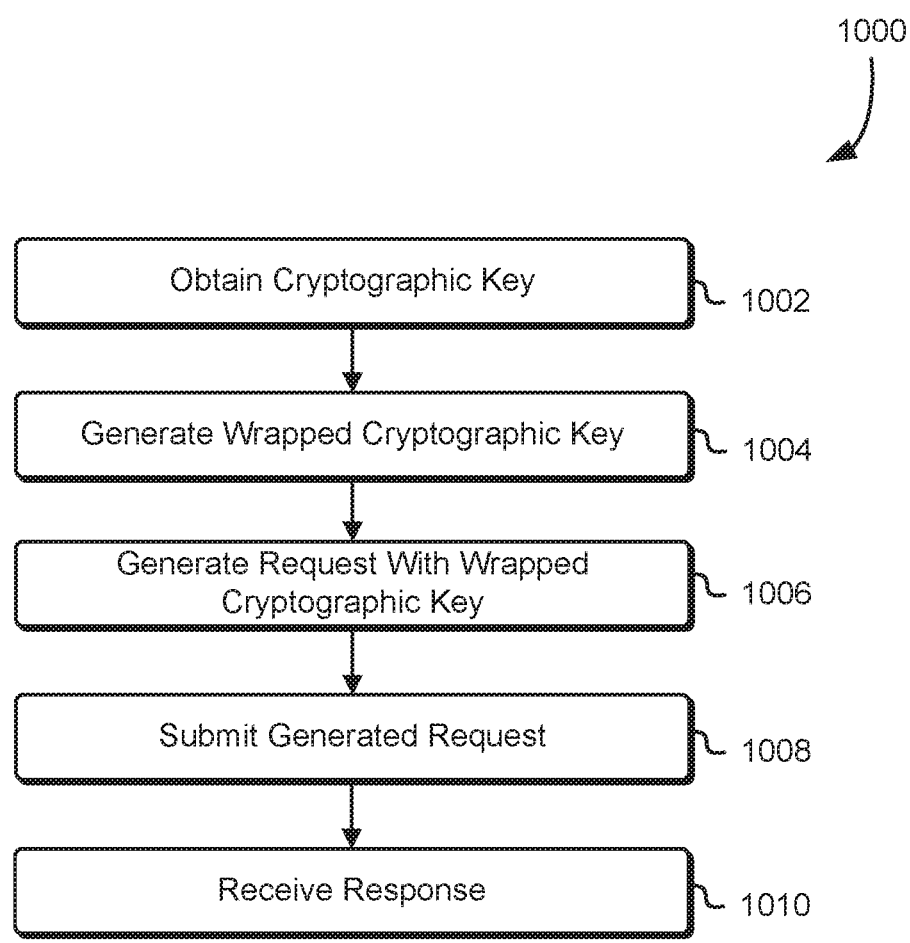
FIG. 10 shows an illustrative example of a process for submitting a request in accordance with at least one embodiment.

FIG. 10 shows an illustrative example of a process 1000 which may be used to submit a request in accordance with various embodiments. The process 1000 may be performed by any suitable system such as by a system of a customer of a provider such as described above. In an embodiment, the process 1000 includes obtaining 1002 a cryptographic key where the cryptographic key may be obtained 1002 such as described above. The obtained cryptographic key may be used to generate 1004 a wrapped cryptographic key that is the obtained cryptographic key encrypted under another key. Examples of wrapped cryptographic keys are described above in connection with FIG. 9. The process 1000 may include generating 1006 a request with the wrapped cryptographic key. That is the request may be generated to include the wrapped cryptographic key. The generated request may then be submitted 1008 such as described above. In various embodiments, the process 1000 may also include receiving 1010 a response to the request that was submitted 1008.

Figure 11:
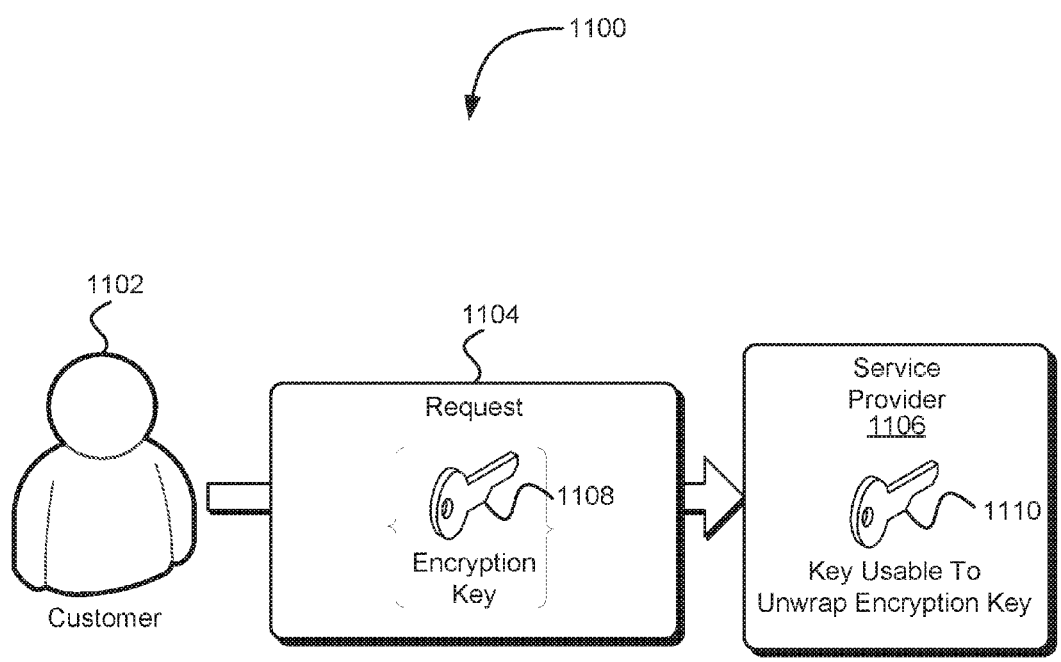
FIG. 11 shows an illustrative example of an environment in which various embodiments can be implemented.

As noted above, numerous embodiments are considered as being within the scope of the present disclosure. In some embodiments, a customer and service provider are able to interact to achieve data security without use of a third party system to unwrap a key needed for cryptographic operations. FIG. 11 accordingly shows an illustrative example of an environment 1100 in which various embodiments can be practiced. As with FIG. 1, as illustrated in FIG. 11, the environment 1100 includes a customer 1102 that submits a request 1104 to a service provider 1106. In this example, the request 1104 includes an encryption key 1108 which, as indicated by the brackets surrounding the encryption key, is wrapped by another key. The service provider 1106 has access to a key 1110 usable to unwrap the encryption key thereby enabling the service provider 1106 to perform cryptographic operations using encryption key 1108.

Figure 12:
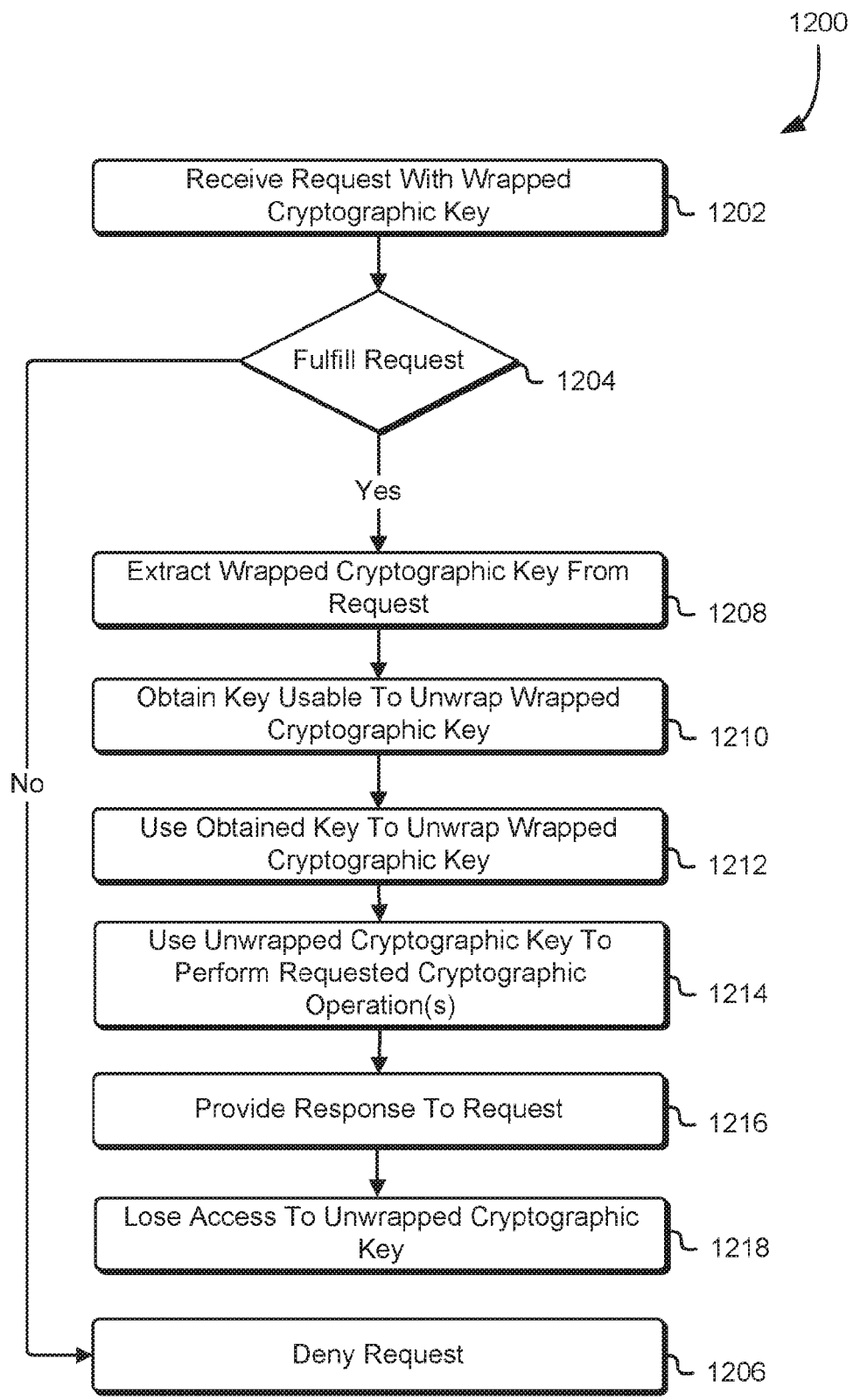
FIG. 12 shows an illustrative example of a process for processing a request in accordance with at least one embodiment.

FIG. 12 shows an illustrative example of a process 1200 which may be used to process a request that includes a wrapped cryptographic key. The process 1200 may be performed by any suitable system such as by a webserver of a service provider 1106 described above in connection with FIG. 11. In an embodiment the process 1200 includes receiving 1202 a request that has a wrapped cryptographic key. A determination may be made 1204 whether to fulfill the request. If determined 1204 to not fulfill the request, the process 1200 may include denying 1206 the request such as described above. If, however, it is determined 1204 that the request should be fulfilled, the process 1200 may include extracting 1208 the wrapped cryptographic key from the request.

A key usable to unwrap the cryptographic key may be obtained 1210. Obtaining the key usable to unwrap the cryptographic key may be performed in various ways in accordance with various embodiments. For example, the key usable to unwrap the wrapped cryptographic key may be stored by a system that performs the process 1200. An identifier of the key usable to unwrap the wrapped cryptographic key may be used to locate the key usable to unwrap the wrapped cryptographic key from other keys which may be stored by the system. The identifier may be provided in the request that was received 1202 or may be otherwise determined such as by an association with an entity that submitted the request. Once the key usable to unwrap the wrapped cryptographic key has been obtained 1210, the process 1200 may include using 1212 the obtained key to unwrap the wrapped cryptographic key. In this manner, an unwrapped cryptographic key is obtained. The unwrapped cryptographic key may be used 1214 to perform one or more cryptographic operations involved in fulfillment of the request that was received 1202. A response to the request may be provided 1216 such as described above and access to the unwrapped cryptographic key may be lost 1218.

Figure 13:
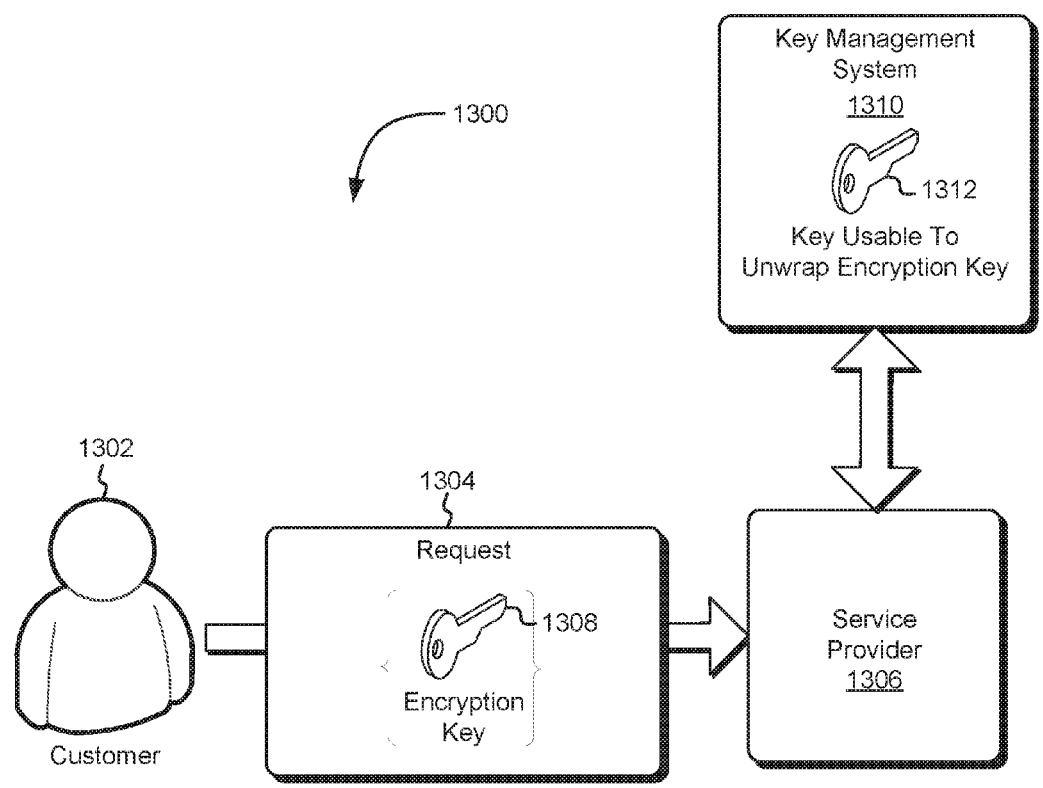
FIG. 13 shows an illustrative example of an environment in which various embodiments can be implemented.

In some embodiments, as noted, involvement of a third party is part of maintaining data security. FIG. 13 accordingly shows an illustrative example of an environment 1300 with various embodiments can be practiced. The environment 1300 as illustrated includes a customer 1302 that submits a request 1304 to a service provider 1306 such as described above. Also as described above, the request 1304 may include an encryption key 1308 that is wrapped by another key such as described above in connection with FIG. 9. However, in the example of FIG. 13, a subsystem of the service provider 1306 that receives the request (or, in some embodiments, all subsystems of the service provider) may not have access to a key usable to unwrap the encryption key 1308. Accordingly, the environment 1300 includes a key management system 1310 which has access to a key 1312 usable to unwrap the wrapped encryption key 1308. The key management system 1310 may be any system operable to manage cryptographic keys on behalf of one or more customers of the service provider 1306.

The key management system 1310 may be implemented in various ways in accordance with various embodiments. In some embodiments, the key management system is a subsystem of the service provider 1306 which may be implemented by, for instance, a hardware security module (HSM) hosted by the service provider 1306 or another type of security module that securely stores cryptographic keys. In some embodiments, the key management system 1310 is implemented as another service of the service provider 1306 which may be one of several services provided by the service provider 1306 and accessible to customer 1302 over a network such as described below. In some embodiments, the key management system is a system such as described above, however, implemented by a third party to the service provider 1306 and customer 1302. In such embodiments, neither the customer 1302 nor the service provider 1306 has access to the key usable to unwrap the encryption key 1308 unless the key 1312 usable to unwrap the encryption key is shared with one or more of the customer 1302 or service provider 1306. Other variations are also considered as being within the scope of the present disclosure. For example, the key management system 1310 may be implemented as part of the customer 1302 in some embodiments. Generally, the key management system 1310 is a system with which the service provider 1306 must communicate in order to unwrap or generally cause to have unwrapped the encryption key 1308 using the key 1312 usable to unwrap the encryption key. Communication between the service provider 1306 and the key management system 1310 may occur over one or more networks and in accordance with one or more appropriate network protocols. The network may be, for example, the Internet or any suitable network such as described below.

Figure 14:
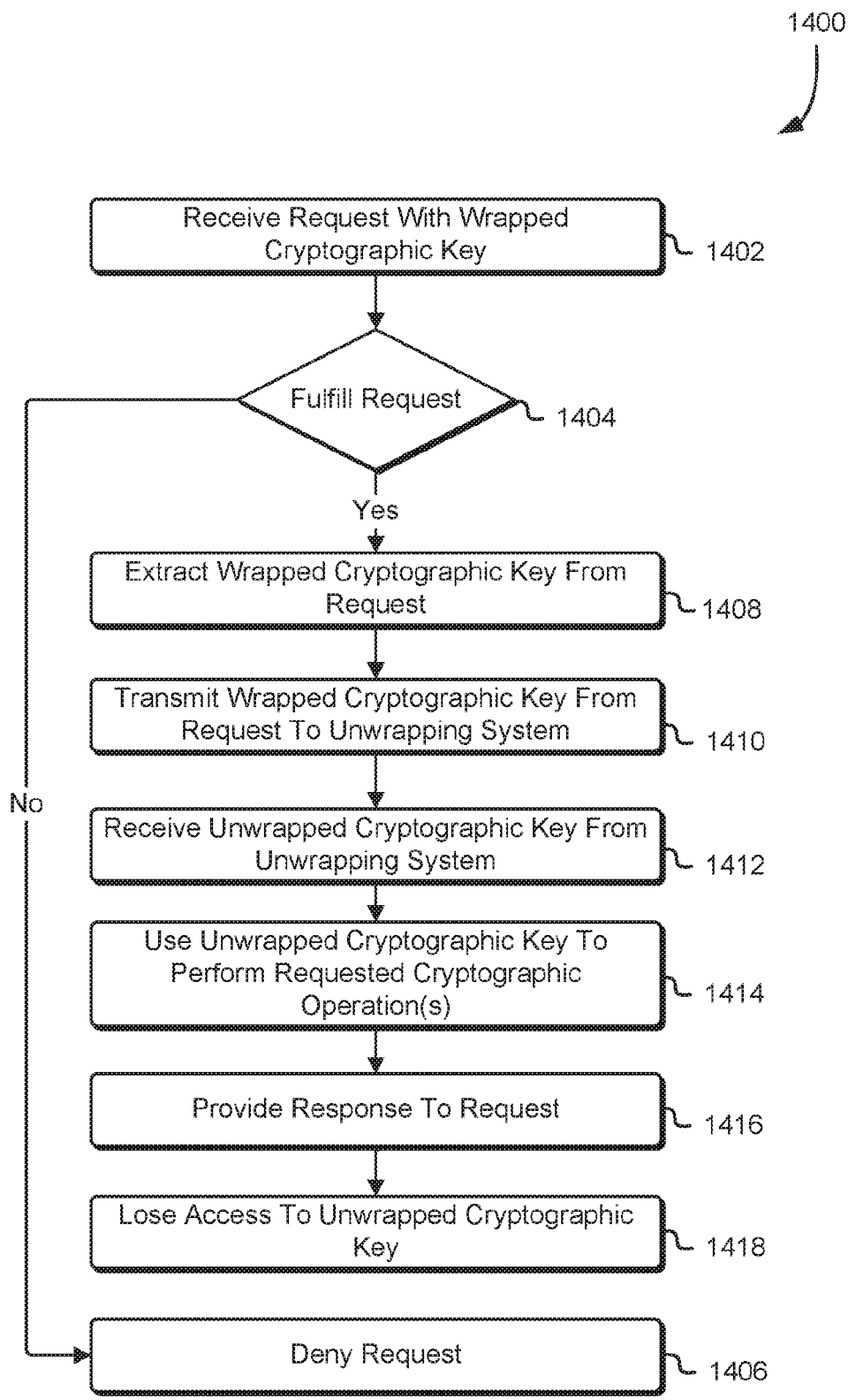
FIG. 14 shows an illustrative example of a process for processing a request in accordance with at least one embodiment.

FIG. 14 shows an illustrative example of a process 1400 which may be performed to process a request that includes a wrapped encryption key such as described above in connection with FIG. 13. In an embodiment, the process 1400 includes receiving 1402 a request with the wrapped cryptographic key such as described above. As discussed above in connection with other processes, a determination may be made 1404 whether to fulfill the request, and if determined 1404 that the request should not be fulfilled the process 1400 may include denying 1406 the request. If, however, it is determined 1404 that the request should be fulfilled, the process 1400 may include extracting the wrapped cryptographic key from the request. The wrapped cryptographic key may be transmitted 1410 to an unwrapping system which may be a key management system such as described above as in connection with FIG. 13 and generally which may be a system with access to a key usable to unwrap the wrapped cryptographic key.

The wrapped cryptographic key may be transmitted in the form of a request to the unwrapping system which is appropriately configured for fulfillment by the unwrapping system. For example, the request may be formatted in accordance with a format acceptable to the unwrapping system and the request may include information usable by the unwrapping system to determine whether to fulfill the request. Such information may include, for example, authentication information used to authenticate the request to the unwrapping system and/or the request that was received 1402 with the wrapped cryptographic key. Other information which may be used, for example, to determine whether fulfillment of the request to the unwrapping system complies with one or more policies may also be provided or the information may be contextual information such as described above. Additional information may include an identifier of a key usable to unwrap the wrapped cryptographic key. Assuming that the unwrapping system fulfills the request that was transmitted 1410, the process 1400 may include receiving 1412 the unwrapped cryptographic key from the unwrapping system. The unwrapped cryptographic key may be used 1414 to perform one or more cryptographic operations involved in fulfillment of the request that was received 1402. As response to the request may be provided 1416 such as described above and access to the unwrapped cryptographic key may be lost 1418, such as described above.

As noted several times throughout the above disclosure, numerous variations are considered as being within the scope of the present disclosure. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure.

In addition, as noted, various embodiments of the present disclosure relate to the use of cryptographic keys included in requests to perform various cryptographic operations. While the keys are discussed as being used to perform the operations, it should be noted that various embodiments of the present disclosure include those where keys are transformed in some way before being used. As an example, in cases where a key in a request is a passcode, the passcode may be transformed (e.g., with a key derivation function) before being used to perform additional cryptographic operations. Further, while the above disclosure discusses specific types of keys (e.g., encryption keys) such keys may similarly be transformed before use. Other variations include those where multiple keys are provided in requests and request parameters and/or formatting of the request indicate how the multiple keys should be used.

Other variations considered as being within the scope of the present disclosure include embodiments that utilize pre-signed uniform resource locators (URLs). Referring to environments such as illustrated in FIG. 1 that include a customer of a service provider, a customer can pre-generate URLs that include an electronic signature of a portion of the URL and/or other information, such as a cryptographic key. The customer may provide the URL to another entity and the other entity can utilize the URL to submit requests to the service provider to cause the service provider to perform one or more operations under the authorization of the customer. The service provider can receive a request submitted with the URL, verify the electronic signature, and perform the one or more operations using a key provided in the URL. In this manner, various conveniences involving server-side encryption and decryption with customer control over keys and provider inability to access keys except when necessary are achieved. The use of pre-signed URLs and variations thereof are discussed in detail in concurrently filed U.S. patent application Ser. No. 14/037,282, entitled "Resource Locators With Keys," which is incorporated by reference in its entirety.

Figure 15:
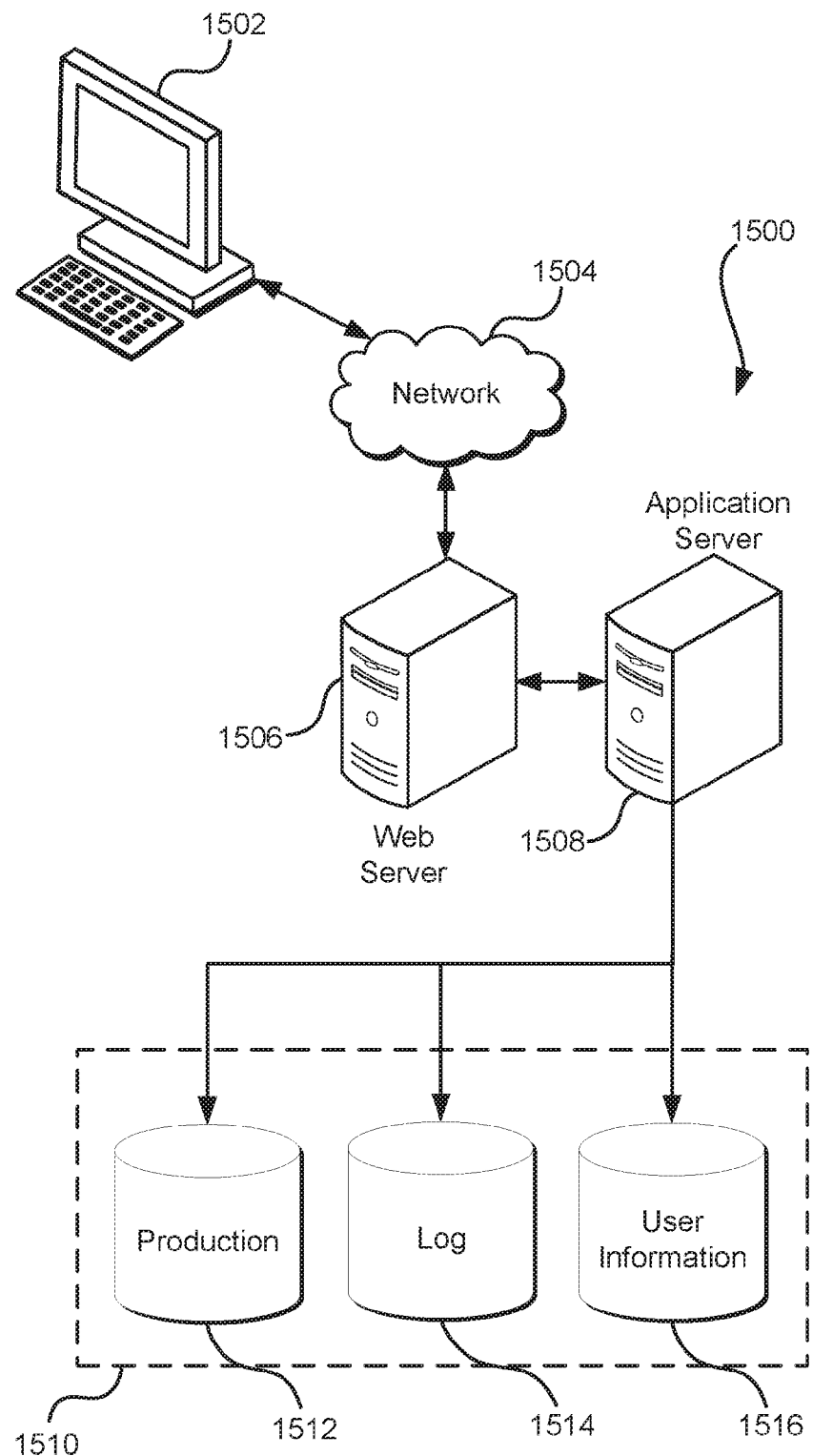
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1510 can include several separate data tables, databases or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request over a network, the request specifying data and including an encrypted cryptographic key, wherein the data is not included in the request;
   causing the encrypted cryptographic key to be decrypted by at least transmitting the encrypted cryptographic key to another entity for decryption, thereby resulting in a decrypted cryptographic key;
   performing one or more cryptographic operations on the specified data using the decrypted cryptographic key to encrypt the specified data to fulfill the request; and
   providing a result of performing the one or more cryptographic operations.

2. The computer-implemented method of claim 1, wherein the request includes information usable to authenticate the request using the decrypted cryptographic key.

3. The computer-implemented method of claim 1, wherein:
   the decrypted cryptographic key is a symmetric cryptographic key.

4. The computer-implemented method of claim 1, wherein:
   the request is a request to store the specified data in encrypted form in a data storage system;
   the one or more cryptographic operations include encryption of the specified data using the decrypted cryptographic key; and
   providing the result of performing the one or more cryptographic operations includes transmitting the specified data in encrypted form to the data storage system for persistent storage.

5. The computer-implemented method of claim 1, further comprising, at a time after performing the one or more cryptographic operations, performing one or more operations that cause a loss of access to the decrypted cryptographic key.

6. The computer-implemented method of claim 1, wherein receipt of the decrypted cryptographic key from the other entity results in access to the decrypted cryptographic key that was lacked prior to the receipt.

7. A system, comprising:
   one or more processors; and
   memory including instructions that, as a result of execution by the one or more processors, cause the system to:
      receive, from a requestor over a network, a request whose fulfillment involves performance of one or more cryptographic operations on data specified in the request using information that comprises an encrypted cryptographic key supplied in the request, wherein the data is not included in the request;
      perform the one or more cryptographic operations on the specified data using the encrypted cryptographic key supplied in the request, including causing the encrypted cryptographic key supplied in the request to be decrypted by at least transmitting the encrypted cryptographic key to another entity for decryption, thereby resulting in a decrypted cryptographic key, and using the decrypted cryptographic key to encrypt the specified data; and
      provide a result of performing the one or more cryptographic operations.

8. The system of claim 7, wherein:
   performing the one or more cryptographic operations on the specified data includes decrypting the specified data from a data storage system using the decrypted cryptographic key.

9. The system of claim 7, wherein the information is usable to authenticate the request by including an electronic signature generated based at least in part on a second cryptographic key different from the encrypted cryptographic key.

10. The system of claim 7, wherein:
    the request is a request to store the specified data in encrypted form in a data storage system;
    the one or more cryptographic operations include encryption of the specified data; and
    providing the result of performing the one or more cryptographic operations includes transmitting the specified data in encrypted form to the data storage system for persistent storage.

11. The system of claim 7, wherein the information further includes instructions that cause the system to perform one or more operations to lose access to the decrypted cryptographic key at a time after performing the one or more cryptographic operations.

12. The system of claim 7, wherein the system lacks access to the decrypted cryptographic key for an amount of time until the request is received.

13. The system of claim 7, wherein the request comprises the encrypted cryptographic key in a uniform resource locator.

14. A non-transitory computer-readable storage medium having stored thereon instructions that, if executed by one or more processors of a computer system, cause the computer system to:

receive, from a requestor over a network, a request whose fulfillment involves performance of one or more cryptographic operations on data specified in the request using information that comprises an encrypted cryptographic key supplied in the request, wherein the data is not included in the request;

perform the one or more cryptographic operations on the specified data, using the encrypted cryptographic key supplied in the request, including causing the encrypted cryptographic key supplied in the request to be decrypted by at least transmitting the encrypted cryptographic key to another entity for decryption, thereby resulting in a decrypted cryptographic key, and using the decrypted cryptographic key to encrypt the specified data; and provide a result of performing the one or more cryptographic operations.

15. The non-transitory computer-readable storage medium of claim 14, wherein:

performing the one or more cryptographic operations on the specified data includes decrypting the specified data from a data storage system using the decrypted cryptographic key.

16. The non-transitory computer-readable storage medium of claim 14, wherein the information is usable to authenticate the request by using the decrypted cryptographic key to authenticate the request.

17. The non-transitory computer-readable storage medium of claim 14, wherein:

the request is a request to store the specified data in encrypted form in a data storage system;

the one or more cryptographic operations include encryption of the specified data; and providing the result of performing the one or more cryptographic operations includes transmitting the specified data in encrypted form to the data storage system for persistent storage.

18. The non-transitory computer-readable storage medium of claim 14, wherein the decrypted cryptographic key is a symmetric cryptographic key.

19. The non-transitory computer-readable storage medium of claim 14, wherein the encrypted cryptographic key is obtained from a uniform resource locator included in the request.

* * * * *